United States Patent

[11] 3,579,970

| [72] | Inventors | Edward I. Gilbert, deceased, late of Dallas<br>Edith M. Graff, Administratrix, Dallas;<br>William A. Rogers, Portland, Oreg. |
|---|---|---|
| [21] | Appl. No. | 871,763 |
| [22] | Filed | July 10, 1969 |
| [45] | Patented | May 25, 1971 |
| [73] | Assignee | Said Edith M. Graff, Administratrix assignor to Edith M. Graff<br>Continuation of application Ser. No. 641,951, May 29, 1967, now abandoned. |

[54] ADJUSTABLE SUPPORT FOR TREE SHAKING APPARATUS
9 Claims, 3 Drawing Figs.

[52] U.S. Cl. ..................................................... 56/328,
248/13, 52/114
[51] Int. Cl. ....................................................... A01g 19/00
[50] Field of Search ........................................... 56/328,
329; 52/114, 115, 122, 649; 182/64, 65;
248/2—13

[56] References Cited
UNITED STATES PATENTS
| 2,690,639 | 10/1954 | Goodwin | 56/328 |
| 2,690,896 | 10/1954 | Bissell et al. | 248/13 |
| 3,059,402 | 10/1962 | Shipley, Jr. | 56/328 |
| 3,121,304 | 2/1964 | Herbst | 56/328 |
| 3,401,514 | 9/1968 | Clark | 56/328 |
| 3,457,712 | 7/1969 | Gould et al. | 56/328 |

*Primary Examiner*—Russell R. Kinsey
*Attorney*—Kolisch and Hartwell

ABSTRACT: An adjustable support is designed for mounting tree shaking apparatus in a wide variety of positions as required to connect the apparatus to selected branches of fruit and nut trees about to be harvested. The support includes a base; a first vertical shaft is journaled on the base. A first horizontal arm has its inner end fixed to the first vertical shaft. A second vertical shaft is journaled on the outer end of the first horizontal arm. A second horizontal arm is keyed to the second vertical shaft. Mounting means on the outer end of the second horizontal arm mount the shaking apparatus. Drive means are provided for driving the arms independently of each other, as required to place the shaking unit in positions where it can reach the tree branches to which it is to be attached.

Fig. 3.

PATENTED MAY 25 1971 3,579,970
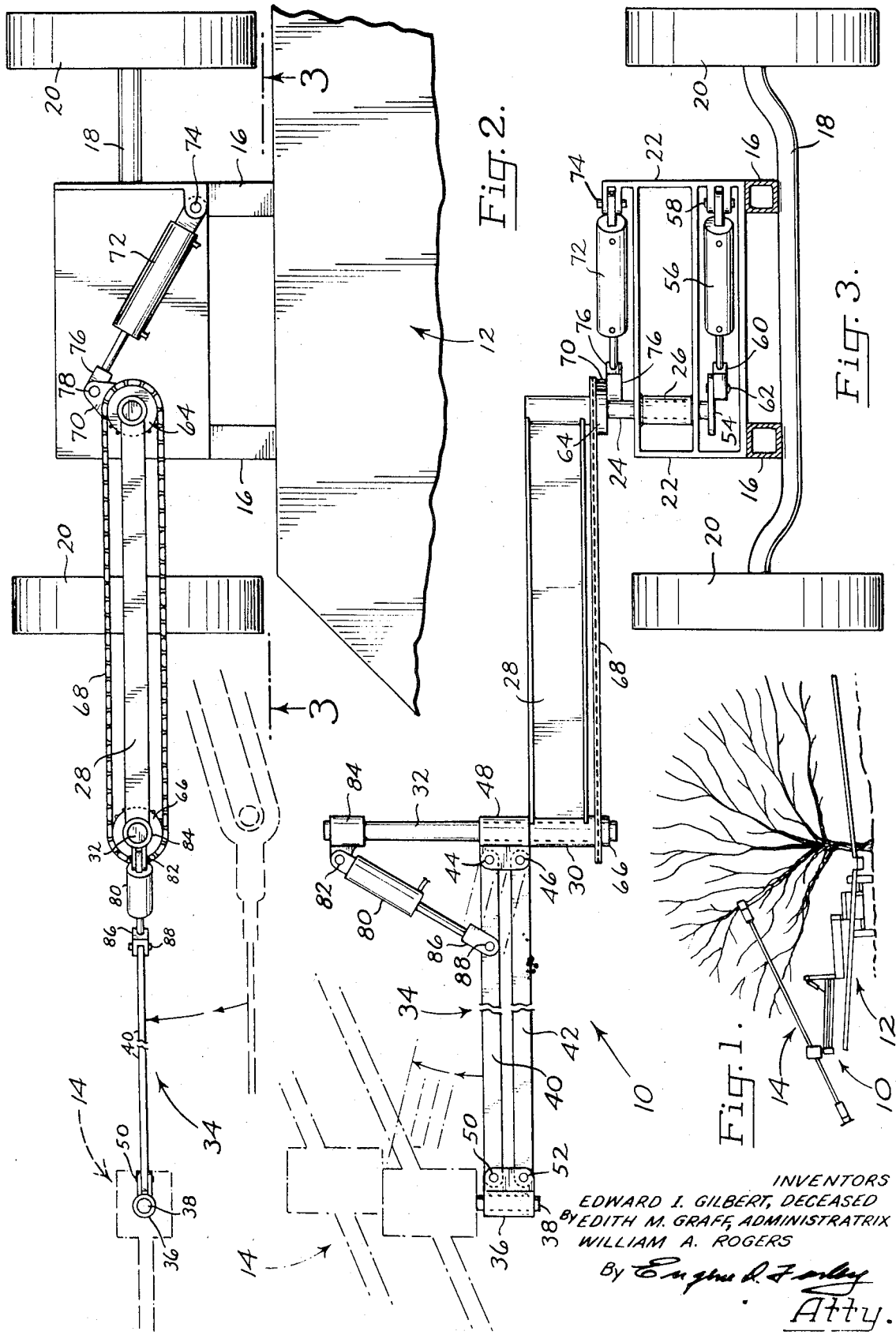
INVENTORS
EDWARD I. GILBERT, DECEASED
BY EDITH M. GRAFF, ADMINISTRATRIX
WILLIAM A. ROGERS
By Eugene D. Farley
Atty.

ADJUSTABLE SUPPORT FOR TREE SHAKING APPARATUS

This application is a continuation of prior-filed application of William A. Rogers and Edward I. Gilbert for "Adjustable Support for Tree Shaking Apparatus," filed May 29, 1967, Ser. No. 641,951 and now abandoned.

This invention relates to an adjustable support for tree shaking apparatus. It pertains particularly to an adjustable support for tree shaking apparatus to be used in harvesting nuts and fruits.

Various types of shaking machines are employed for harvesting fruits and nuts. These are attached to selected branches of the trees and shake the fruits or nuts onto the ground or, preferably, into suitable collecting apparatus.

Such shaking apparatus is difficult to use because it is not sufficiently versatile to be attached conveniently to all of the branches, which project out in various directions at all angles. As a result, the shaking apparatus must be moved frequently and, if incorrectly applied, may damage the bark and branches of the tree, as well as the apparatus itself.

It is the general purpose of the present invention to supply an adjustable support for shaking apparatus which enables the apparatus to serve as a useful adjunct of fruit and nut collecting apparatus, which is flexible in its operation to enable coupling the shaking apparatus to the tree branches in a wide variety of difficult positions, which avoids damage to the tree, and which may be controlled easily, accurately and rapidly from the operator's station.

Broadly considered, the presently described adjustable support comprises a base which may be located adjacent the tree, preferably as a supplement to the fruit and nut collecting unit. The base journals a first vertical shaft. This shaft is fixed to the inner end of the first horizontal arm. The inner end of a second horizontal shaft is fixed to the second vertical shaft. The outer end of the second horizontal arm provides mounting means, preferably pivotal mounting means, for mounting the tree shaking apparatus.

Drive means are coupled to the two shafts to drive them angularly and individually in their respective horizontal planes. In addition, one of the horizontal arms, preferably the second one, is mounted pivotally in a vertical plane and coupled to drive means which move it angularly in a vertical plane.

Thus by operation of the support, the shaking unit may be moved to any desired location as required to position the shaking unit in a location where it may be connected to the selected tree branch.

Considering the foregoing in greater detail and with particular reference to the drawings, wherein:

FIG. 1 is a schematic view of a fruit tree illustrating the herein described shaking apparatus support in its operative position with respect to the tree;

FIG. 2 is a plan view of the support; and

FIG. 3 is a sectional view of the support in elevation, the second being taken along the arrowed line 3–3 in FIG. 2.

As illustrated schematically in FIG. 1, the shaking apparatus support of our invention, indicated generally at 10, is adapted for use in conjunction with various types of fruit and nut collecting units. It may, for example, be mounted on tractors, tricycle carriers, jeeps and pickup trucks. Preferably, however, it is used in conjunction with fruit and nut collecting apparatus indicated generally at 12, such as is disclosed in our copending patent application, Ser. No. 550,350, now U.S. Pat. No. 3,412,539 filed May 16, 1966 entitled "Harvesting Apparatus for Fruits and Nuts."

The latter harvesting apparatus broadly comprises a mobile collecting web which is located beneath the tree. A shaking unit indicated generally at 14 is attached to the branches of the tree and shakes them for dislodging the fruits and nuts. These fall onto the web and are guided to a central collecting station.

The support of the present invention is used as an adjunct to the collecting apparatus for mounting the shaking unit in the optimum positions for reaching and shaking all or most of the branches of a given tree.

Thus as shown in FIGS. 2 and 3, the support may be mounted as a trailer connected to the rearward end of collecting unit 12. This may be accomplished in various ways, for example, by providing longitudinal frame extensions 16 welded to an axle 18 on which are mounted wheels 20.

Frame members 16 mounts a base 22 which in turn mounts the herein described adjustable shaking unit support.

To this end a first vertical shaft 24 is journaled in a thrust bearing 26 carried by the base. Both the upper and lower ends of the shaft extend outwardly from the bearing. The upper end mounts rigidly the inner end of a first horizontal arm 28. This is of substantial construction and may comprise for example, a length of I-beam.

The outer end of horizontal arm 28 mounts a second thrust bearing 30 which journals a second vertical shaft 32. As is the case with shaft 24, shaft 32 is of sufficient length so that both of its ends project outwardly from the bearing which mounts it.

The inner end of a second horizontal arm 34 is keyed to shaft 32. The outer end of horizontal arm 34 mounts a vertically arranged thrust bearing 36 which journals the shaft 38 of shaking unit 14. The latter unit may comprise any of several commercial units presently available and per se forms no part of the present invention.

Preferably arm 34 is so constructed that it may be moved angularly in both vertical and horizontal planes. To this end it may comprise a pantograph arm including upper and lower bars 40, 42, the inner ends of which are pivotally connected by pivot pins 44, 46 to a sleeve 48 which receives and is keyed to shaft 32.

The outer ends of pantograph arms 40, 42 are pivotally attached by means of pins 50, 52 to thrust bearing 36 which mounts the shaft of shaking unit 14.

Drive means are provided for driving the various elements of the assembly.

Thus horizontal arm 28 is moved angularly in a horizontal plane by a drive including a crank 54 which is secured to the lower projecting end of shaft 24. A double-acting, fluid-operated cylinder, preferably a hydraulic cylinder 56, is arranged with its case connected by a pivot pin 58 to base 22 and with the head 60 of its piston rod coupled by means of pin 62 to the outer end of the crank. Operation of the crank by means of the cylinder thus oscillates arm 28 in the desired manner.

Horizontal arm 34 may be moved angularly in a horizontal plane in similar manner. In this case, however, a connecting linkage is employed which maintains the arm in a fixed direction of alignment with the oscillation of arm 28.

For this purpose the upper outwardly projecting end of shaft 24 mounts a freely rotatable sprocket 64. The lower projecting end of shaft 32 mounts a rigidly connected sprocket 66. A chain 68 interconnects the two sprockets.

A crank 70 is welded or otherwise fixed solidly to sprocket 64. The crank is driven by a double-acting fluid-operated cylinder, preferably hydraulic cylinder 72. The case of the cylinder is pivoted to base 22 by pivot pin 74. The head 76 of the piston rod is pivotally connected to crank 70 by means of pivot pin 78.

Extension and retraction of cylinder 72 thus drives crank 76 which in turn rotates shaft 32 through the connecting chain of sprocket linkage. The desired angular adjustment of horizontal arm 34 thus is obtained.

It is to be noted particularly however, that in a given position of adjustment of crank 70, i.e. when cylinder 72 remains inoperative, arm 34 will remain in a fixed position of alignment during the angular sweep of arm 28. This is illustrated by the solid line and dotted line positions of FIG. 2. It is of importance because it enables reaching into the tree in the same direction from various angular positions of arm 28. This in turn increases the versatility of the implement.

The drive for the vertical angular adjustment of outer horizontal arm 34 includes a single-acting, fluid-operated cylinder, preferably hydraulic cylinder 80. The case of the cylinder is pivotally connected by means of a pivot pin 82 to a bracket 84 which in turn is rigid to an upward extension of shaft 32.

The piston rod of the cylinder mounts a clevis 86 connected through pivot pin 88 to an intermediate position on the upper member 40 of pantograph arm 34.

Extension and retraction of the cylinder thus moves the arm assembly angularly in a vertical plane. The shaking unit 14 at all times, however, is maintained in its erect operative position as illustrated by the dotted line positions of FIG. 3.

It thus is apparent that by the present invention we have provided a mount for tree shaking apparatus which is versatile, easily controlled, and operative to place the shaking unit where it can be attached from a single station to all or a majority of the branches of the tree, without damage either to the tree or to the apparatus itself.

It is to be understood that the form of our invention herein shown and described is to be taken as an illustrative example of the same and that various changes in the shape, size and arrangement of parts may be resorted to without departing from the spirit of our invention or the scope of the subjoined claims.

It is claimed and desired to secure by Letters Patent:

1. An adjustable support for tree-shaking apparatus comprising:

first and second elongated generally horizontally disposed arms having an adjacent set of ends and ends opposite said adjacent set of ends, and connecting means pivotally interconnecting the arms at their said adjacent set of ends permitting side-to-side swinging of the second arm with respect to the first;

a base;

connecting means pivotally connecting the said opposite end of said first arm to said base permitting side-to-side swinging of the said first arm with respect to the base;

power-operated adjustable means operatively connnected to said first arm for adjusting the angular position of the arm by such swinging of said arm and for then holding the arm in a given angular position;

power-operated adjustable means operatively connected to said second arm for adjusting the angular position of the second arm by swinging of the second arm and for then holding the second arm in a given angular position; and mounting means on the outer end of the second arm for mounting tree-shaking apparatus thereon.

2. The support of claim 1, wherein at least one of said connecting means includes pivot means permitting an arm to be adjusted by its being swung up and down thus to change the elevation at which said mounting means is held.

3. The adjustable support of claim 1, wherein said power-operated adjustable means which is connected to the second arm is interposed between the second arm and said base and is effective to hold the second arm in a given angular position with respect to the first arm with the first arm stationary and to produce relative shifting of the second with respect to the first arm on movement of the first arm.

4. In tree-shaking apparatus:

a movable frame;

a first elongated arm and journal means mounting an end of said arm on said frame whereby the arm is swingable from side-to-side laterally of the frame;

a second elongated arm and journal means mounting one end of said second arm on the end of the first arm opposite the first arm's said one end;

tree-shaker apparatus comprising an elongated boom journaled for side-to-side swinging on the end of said second arm opposite the second arm's said one end;

power-operated adjustable means operatively connected to said first arm for adjusting the angular position of the first arm with respect to said frame by swinging the arm and for then holding the arm in a given angular position with respect to said frame; and power-operated adjustable means operatively connected to said second arm for adjusting the angular position of the second arm and for then holding the second arm in a given angular position.

5. An adjustable support for tree-shaking apparatus comprising:

a base;

a first vertical shaft journaled on the base;

a first horizontal arm having its inner end fixed to the first shaft;

a second vertical shaft journaled on the outer end of the first horizontal arm;

a second horizontal arm having its inner end secured to the second shaft;

first drive means connected to the first horizontal arm for angularly rotating the same in a horizontal plane;

second drive means connected to the second horizontal arm for angularly rotating the same in a horizontal plane; and mounting means on the outer end of the second horizontal arm for mounting tree-shaking apparatus thereon.

6. The adjustable support of claim 5 wherein the second horizontal arm comprises a pantograph arm arranged in a vertical plane and including a fluid-operated cylinder having its case and piston rod interconnecting the pantograph arm and a frame member for adjusting the arm in a selected position of vertical angular adjustment.

7. The adjustable support of claim 5 wherein the first drive means comprises a crank fixed to the first vertical shaft and a fluid-operated cylinder interconnecting the crank and the base.

8. The adjustable support of claim 5 wherein the second drive means comprises crank means, fluid-operated cylinder means operatively connected to the crank means; and connecting means connecting the crank and the second vertical shaft.

9. The adjustable support of claim 5 wherein the second drive means comprises crank means, fluid-operated cylinder means operatively connected to the crank means, and connecting means connecting the crank and the second vertical shaft, the connecting means comprising a sprocket rotatably mounted on the first vertical shaft and mounting the crank, a sprocket keyed to the second vertical shaft, and a chain interconnecting the two sprockets.